US012564815B2

(12) United States Patent
Hengl et al.

(10) Patent No.: US 12,564,815 B2
(45) Date of Patent: Mar. 3, 2026

(54) LIQUID FILTRATION DEVICE COMPRISING AN ULTRASOUND EMISSION MODULE

(71) Applicants: Université Grenoble Alpes, Saint-Martin-d'Hères (FR); Institut Polytechnique de Grenoble, Grenoble (FR); Centre National de la Recherche Scientifique, Paris (FR)

(72) Inventors: Nicolas Hengl, Castelmaurou (FR); Frédéric Pignon, Grenoble (FR); Nicolas Gondrexon, Meylan (FR); Stéphane Baup, Chambéry (FR); Yao Jin, Chengdu (CN)

(73) Assignees: UNIVERSITE GRENOBLE ALPES, Saint-Martin-D'Héres (FR); INSTITUT POLYTECHNIQUE DE GRENOBLE, Grenoble (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 595 days.

(21) Appl. No.: 17/779,228

(22) PCT Filed: Nov. 24, 2020

(86) PCT No.: PCT/FR2020/052166
§ 371 (c)(1),
(2) Date: May 24, 2022

(87) PCT Pub. No.: WO2021/105609
PCT Pub. Date: Jun. 3, 2021

(65) Prior Publication Data
US 2022/0401887 A1 Dec. 22, 2022

(30) Foreign Application Priority Data
Nov. 26, 2019 (FR) ..................................... 1913226

(51) Int. Cl.
*B01D 63/06* (2006.01)
*B01D 61/18* (2006.01)
(Continued)

(52) U.S. Cl.
CPC ............. *B01D 63/06* (2013.01); *B01D 61/18* (2013.01); *B01D 61/20* (2013.01); *B01D 63/16* (2013.01);
(Continued)

(58) Field of Classification Search
CPC ........ B01D 63/06; B01D 63/16; B01D 61/18; B01D 61/20; B01D 65/02; B01D 2313/13;
(Continued)

(56) References Cited

U.S. PATENT DOCUMENTS 4,253,962 A 3/1981 Thompson
4,952,317 A * 8/1990 Culkin ................... B01D 63/16
210/636

(Continued)

FOREIGN PATENT DOCUMENTS

| CN | 107308818 A | * 11/2017 | ............. B01D 65/04 |
| DE | 19606420 C1 | * 7/1997 | ............. B01D 29/33 |
| FR | 2789331 A1 | 8/2000 | |

OTHER PUBLICATIONS

DE 19606420 C1 Translated (Year: 1997).*
(Continued)

*Primary Examiner* — Magali P Slawski
*Assistant Examiner* — Marriah Cg Ellington
(74) *Attorney, Agent, or Firm* — CANTOR COLBURN LLP

(57) ABSTRACT

A device for filtering liquids, including a filtration module and an ultrasound emission module, where the ultrasound emission module is fixed distant from the filtration module using a fixing means, and the ultrasound emission module is equipped coaxially along its axis with a weight or is equipped perpendicular to its axis with at least one weight, the filtration module and the ultrasound module equipped with its at least one weight going into resonance via the fixing means when the ultrasound emission module emits ultrasound.

8 Claims, 10 Drawing Sheets

(51) Int. Cl.
 *B01D 61/20* (2006.01)
 *B01D 63/16* (2006.01)
 *B01D 65/02* (2006.01)
(52) U.S. Cl.
 CPC .......... *B01D 65/02* (2013.01); *B01D 2313/13* (2013.01); *B01D 2313/902* (2022.08); *B01D 2315/04* (2013.01); *B01D 2321/2058* (2013.01)
(58) Field of Classification Search
 CPC .......... B01D 2313/902; B01D 2315/04; B01D 2321/2058; B01D 2323/56
 See application file for complete search history.

(56) References Cited

U.S. PATENT DOCUMENTS

| | | | |
|---|---|---|---|
| 2004/0016699 A1* | 1/2004 | Bayevsky | B01D 65/02 210/791 |
| 2009/0101576 A1* | 4/2009 | Rohde | A61M 1/3643 96/204 |
| 2013/0112620 A1* | 5/2013 | Mueller | B01D 63/16 210/646 |
| 2013/0319917 A1* | 12/2013 | Fava | A61M 1/3629 210/136 |

OTHER PUBLICATIONS

Miodrag Prokic, Jon Tapson, and Bruce J.P. Mortimer. The Ultrasonic Hammer Transducer. MPI Ultrasonics—sonic and ultrasonic processing technology. 2001. https://www.mpi-ultrasonics.com/content/ultrasonic-hammer-transducer. Accessed Jun. 26, 2025. (Year: 2001).*

CN-107308818-A translated (Year: 2017).*

Shiran et al. Enhancement of Toxic Substances Clearance from Blood Equvalent solution and Human Whole Blood through High Flux Dialyzer by 1 MHz Ultrasound. J Biomed Phys Eng 2017; 7(2) (Year: 2017).*

Raed A. Al-Juboori and Les Bowtell. Ultrasound Technology Integration into Drinking Water Treatment Train. Sonochemical Reactions. 2019. DOI: http://dx.doi.org/10.5772/intechopen.88124 (Year: 2019).*

Q. Qin et al. Exploring the influence of air resistance on the hollow fiber membrane process in water treatment based on ultrasonic phased array technology Water Research 224 (2022) 119109. https://doi.org/10.1016/j.watres.2022.119109 (Year: 2022).*

International Search Report for corresponding application PCT/FR2020/052166 filed Nov. 24, 2020; Mail date Jan. 21, 2021.

* cited by examiner

Ultrasound frequency: 35 kHz
Temperature: 18±2 °C
$Q_V$ : 70 L.h$^{-1}$ (0.7 m.s$^{-1}$)
TMP: 0.6.10$^5$ Pa

* Supply power

Ultrasound frequency: 35 kHz
Intensity: 0.5 W.cm$^{-2}$
Temperature: 18±2 °C
$Q_V$ : 70 L.h$^{-1}$ (0.7 m.s$^{-1}$)

▨ Ultrasound application

Ultrasound frequency: 35 kHz
Intensity: 0.5 W.cm$^{-2}$
Temperature: 18±2 °C
$Q_V$ : 70 L.h$^{-1}$ (0.7 m.s$^{-1}$)
TMP: 0.6.10$^5$ Pa ▨ Continuous
▨ Pulsed

LIQUID FILTRATION DEVICE COMPRISING AN ULTRASOUND EMISSION MODULE

TECHNICAL FIELD

The present invention relates to a liquid filtration device (D) comprising a filtration module (F) and an ultrasound emission module (US).

In particular, the present invention relates to a liquid filtration device (D) comprising a filtration module (F) and an ultrasound emission module (US) fixed distant from the filtration module.

The present invention finds particular application in the industrial fields involving filtration of liquids, for example in the agro-food industry, in the medical field, veterinarian field, automotive industry, and the micro- or ultra-filtration fields, in the field of processing and/or filtering water, particularly industrial water, desalination, in the field of processing and/or filtration of muds, in the biological field, in the field of processing and/or filtration of solutions and/or biological media, in the field of processing and/or filtration solution and/or medium produced by biological reactor.

In the following description, references enclosed in brackets ([ ]) refer to the list of references presented at the end of the text.

STATE OF THE ART

Filtration using membranes or membrane filtration is a process/method usually used in different industrial fields, such as agro-food, medical, etc. Different filtration methods are used for membrane filtration using different types/categories of membrane. For example, tangential microfiltration (TMF) is a method using microporous membranes comprising pores of variable size on the order of a micron. The membranes used may be of different types, for example of ceramic, polymer, organic, stainless steel, for example coated with titanium dioxide. Another example of filtration method is ultrafiltration (UF) which is a membrane method enabling the extraction of the solvent and solutes, for example ionic or molecular from a solution containing macro solutes, the membranes used having variable pore sizes on the order of a nanometer. Nanofiltration (NF) is another membrane filtration method with membranes the pore diameter whereof is close to a nanometer. Furthermore, reverse osmosis (RO) a membrane filtration method using dense membranes making it possible for example to extract a solution containing salts and/or dissolved substances from pure water.

However, filtration methods using membranes have variations in filtration efficiencies and/or in filtration capacity. In particular, the pores of membranes may have structural alteration in a short time, for example due to the blocking of pores of membranes and/or to any phenomenon likely to modify the properties of said membranes. Thus, these modifications reduce filtration efficiencies and/or may lead to replacement of the membranes.

Also, there is a real need for finding a means for preserving filtration efficacy that's constant over time and/or for restoring the properties of the membranes.

In order to clean the membranes and/or to open up the pores of the filtering membranes and/or to intensify the filtration methods, the use of ultrasound has been studied. In particular, the use of ultrasound has been considered for intensifying the membrane separation methods (Okahata and Noguchi, 1983 [1]), in membrane rinsing methods (Ahmad et al., 2012 [2]; Chai et al., 1999 [3]; Gonzalez- Avila et al., 2012 [4]; Lamminen et al., 2006 [7]) or in control of membrane clogging (Ahmad et al., 2012 [2]; Mirzaie and Mohammadi, 2012 [5]; Muthukumaran et al., 2007 [6]). In particular, ultrasound has been used for cleaning membranes off-line, and controlling clogging in situ during the method process.

However, in order to clean the membranes, the membranes must be removed/separated from the filtration device and placed in an ultrasound bath. In other words, the "cleaning" involves stopping filtration, dismantling the filtration device, handling the membrane, processing the membrane in an ultrasound bath, etc., involving stoppage of filtration for a significant time and potential alteration of the device and/or of the membrane by the numerous required manipulations.

Moreover, in order to control the clogging of the membranes, particularly the blocking of the pores, the immersion of the filtration devices and/or of the membrane module of said filtration devices in an ultrasound bath and/or basin has been studied. However, the installation of this configuration involves the installation of a very particular structure with a particular assembly of the device, which is incompatible with a permanent and/or industrial use of filtration device. Furthermore, in this configuration, the power of the ultrasound is very attenuated and the use in an industrial method is incompatible with the expected efficiencies and resulting space requirement.

There is therefore a real need for finding a device and/or means for overcoming these defects, disadvantages and obstacles of the prior art, particularly a device and/or means making it possible to control membrane filtration methods, their efficacies while reducing costs and/or complexity of the membrane filtration devices and/or the size/space requirement of said filtration devices.

DESCRIPTION OF THE INVENTION

The present invention makes it possible to overcome the disadvantages and obstacles of the prior art by providing a liquid filtration device (D), comprising a filtration module (F) and an ultrasound emission module (US), characterized in that the ultrasound emission module is fixed distant from the filtration module using a fixing means (MF), and the ultrasound emission module is equipped coaxially with a weight (P), the filtration module and the ultrasound module equipped with its weight going into resonance via the fixing means when the ultrasound emission module emits ultrasound.

The present invention makes it possible to overcome the disadvantages and obstacles of the prior art by providing a liquid filtration device (D), comprising a filtration module (F) and an ultrasound emission module (US), characterized in that the ultrasound emission module (US) is fixed distant from the filtration module (F) using a fixing means (MF), and the ultrasound emission module (US) is equipped coaxially along its axis (A2) with a weight (P) or is equipped perpendicular to its axis (A2) with at least one weight (P1, P2), the filtration module and the ultrasound module equipped with its at least one weight (P—P1, P2) going into resonance via the fixing means (MF) when the ultrasound emission module emits ultrasound.

The inventors have demonstrated surprisingly that the device according to the invention, comprising an ultrasound emission module is fixed distant from the filtration module by a fixing means (MF), and the ultrasound emission module is equipped coaxially with a weight (P), enables said filtration module to be placed in vibration. In particular, the inventors have demonstrated surprisingly that the device according to the invention has filtration capacities and/or efficiency and/or efficacy greater than a device not comprising an ultrasound module equipped coaxially with a weight (P) and advantageously makes it possible to increase the filtration performance very significantly.

Furthermore, the inventors have demonstrated that the device according to the invention comprising an ultrasound emission module equipped coaxially with a weight (P) or perpendicularly with at least one weight (P1, P2) advantageously enables the propagation of ultrasound vibrations or waves in the filtration module.

Furthermore, the inventors have demonstrated that the device according to the invention having improved filtration properties and capacities relative to known devices, advantageously makes it possible to be able to reduce the surface area of filter membranes and/or the number thereof while preserving the same filtration efficacy and/or an identical efficiency and/or efficacy and/or stable and homogeneous filtration efficiency over time.

Moreover, advantageously the possible reduction in particular of the surface area of the filter membranes and/or the number thereof advantageously makes it possible to reduce production and/or operating costs of said devices without modifying filtration capacities and/or efficacy and/or efficiency of said devices.

"Liquid" is understood herein as any liquid known to the person skilled in the art or any cavitation liquid. It may involve any solution, medium, fluid, emulsion, composition known to the person skilled in the art. For example, it may involve any liquid present in nature known to the person skilled in the art and/or any liquid capable of being produced by man. For example, it may involve a biological liquid, for example any biological liquid known to the person skilled in the art, for example blood, serum, cephalo rachidian liquid, mucus, urine. It may, for example, involve a liquid for pharmaceutical use and/or capable of being administered to a mammal, for example any liquid for pharmaceutical use known to the person skilled in the art, for example a vaccination composition, an additive composition, a solution for injection, of physiological serum. It may, for example, involve a liquid for cosmetic use, for example any liquid for cosmetic use known to the person skilled in the art, for example a capillary, topical composition, an oil, a vegetable extract. For example, it may involve a liquid from a building, for example any contaminated liquid and/or solution from a building. It may, for example, involve wastewater from sanitary facilities, a liquid containing a contaminant such as a metal, for example lead, nickel, a polluting substance, for example nitrates, salts. It may, for example, involve an agri-food liquid, for example any agri-food liquid and/or composition known to the person skilled in the art, for example water, beverages, fruit and/or vegetable juices, milk, soups, an alcoholic beverage, an alcoholic drink. For example, it may involve a liquid from and/or transformed by the chemical industry, for example any liquid and/or composition from the chemical industry known to the person skilled in the art, for example any liquid from petroleum, for example gasoline, diesel fuel, kerosene, composition comprising polymers, paints.

Coaxial or coaxially herein is understood as arranged on the same axis, having the same axis, or being aligned on a common axis.

Filtration module herein is understood as any filtration module known to the person skilled in the art. For example, it may involve any commercially available filtration module. For example, it may involve any commercially available liquid filtration module. It may, for example, involve a filtration module marketed by TAMI INDUSTRIES, Beko Technologies, Fisher Scientific, Orélis Environnement, SIVA, TIA, NOVASEP, PALL, POLYMEM, PENTAIR.

According to the invention, the filtration module may be in any suitable form known to the person skilled in the art. For example, it may be in the form chosen from the group comprising a tube, a cylinder, a flat tube, a tube corrugated over its length and/or its width, a hollow panel, a sphere, a cube, a rectangular parallelepiped, a spiral, rectangular parallelepiped with rounded edges, a hollow shape without sharp edge. Preferably, the filtration module is tubular in shape.

According to the invention, the filtration module may be any module suitable for micro and/or ultrafiltration of liquids such as those described above. It may involve filtration module suitable for implementation of tubular ceramic membranes for micro, ultrafiltration of liquid as described above.

According to the invention, the filtration module may comprise at least one filter. For example, the filtration module may comprise from 1 to 10 filters, for example from 1 to 7 filters.

According to the invention, the filtration module may extend along a first axis (A1). For example, when the filtration module is tubular, the axis A1 corresponds to the length of the filtration module.

According to the invention, the filtration module may comprise any filter known to the person skilled in the art. For example, it may involve any filter for liquid known to the person skilled in the art. It may, for example, involve a ceramic filter, a polymeric filter, a polymeric hollow fiber membrane, ceramic membrane, metal membranes.

According to the invention, the filter may comprise pores from 1 nanometer to 1 mm.

According to the invention, the filter may comprise pores suitable for the implementation of filtration methods, for example single filtration membranes.

According to the invention, the ceramic filter may be any ceramic filter known to the person skilled in the art. For example, it may involve a commercially available ceramic filter, for example marketed by TAMI INDUSTRIES under the commercial name INSIDE CERAM with a diameter of about 2.5 cm. According to the invention, the ceramic filter may comprise pores from 10 nm to 1 µm.

According to the invention, the polymeric filter may be any polymeric filter known to the person skilled in the art. For example, it may involve a commercially available polymeric filter, for example marketed by POLYMEM under the commercial name PVDF KYNAR. According to the invention, the polymeric filter may comprise pores from 1 nanometer to 100 µm, from 10 nm to 50 µm.

According to the invention, the polymeric hollow fiber membrane may be any polymeric hollow fiber membrane known to the person skilled in the art. For example, it may involve any commercially available hollow fiber membrane. According to the invention, the polymeric filter may comprise pores from 1 nanometer to 100 µm, from 10 nm to 50 µm.

According to the invention, the ceramic membrane may be any ceramic membrane known to the person skilled in the art. For example, it may involve any commercially available ceramic membrane. It may, for example, involve a ceramic membrane marketed by the Alsys Group under the name Membrane BX with a diameter of 25 mm. According to the invention, the ceramic membrane may comprise pores from 1 nm to 10 µm.

Ultrasound emission module herein is understood as any ultrasound emission module known to the person skilled in the art. For example, it may involve a commercially available ultrasound emission module, for example marketed by Sonodis. It may involve, for example, any ultrasound emitter and/or any ultrasound generator and/or any device enabling the emission of ultrasounds known to the person skilled in the art. According to the invention, the ultrasound emission frequency may be between 16,000 and 500,000 Hz, for example from 20 to 100 kHz, for example from 20 to 35 kHz. According to the invention, the ultrasound may be low-frequency ultrasound, for example with a frequency of from 16,000 to 100,000 Hz. The person skilled in the art, starting from this general knowledge will know how to adapt the frequency of the ultrasound based on the liquid to be filtered.

Weight is understood herein as any suitable weight known to the person skilled in the art. It may involve any mass or weight capable of being coaxially connected to an ultrasound emission module. It may also involve any mass or weight capable of being connected perpendicularly to an ultrasound emission module.

According to the invention, the weight may be in any suitable form known to the person skilled in the art. For example, it may be in a form chosen from the group comprising a tube, a cylinder, a cone, a flat tube, a tube corrugated over its length and/or its width, a hollow panel, a sphere, a cube, a rectangular parallelepiped, a spiral, rectangular parallelepiped with rounded edges, a hollow shape without sharp edge, a bell, frustoconical Preferably, the weight is conical and/or frustoconical in shape.

According to the invention, when the weight is conical or frustoconical in shape, the height of the cone may be between 5 and 15 cm, for example between 8 and 15 cm.

According to the invention, when the weight is conical or frustoconical in shape, the diameter of the cone may be between 1 and 5 cm, for example between 2 and 3 cm.

According to the invention, when the weight is frustoconical in shape, the height of the truncated cone may be between 5 and 15 cm, for example between 8 and 15 cm.

According to the invention, when the weight is frustoconical in shape, the diameter may be between 1 and 5 cm, for example between 2 and 3 cm.

According to the invention, the weight of the weight may be from 200 g to 6000 g. For example, the weight of the weight may be from 500 g to 6000 g, from 3000 g to 6000 g, from 500 g to 1000 g.

According to the invention, the weight of the weight may be from 200 g to 2000 g, preferably from 500 g to 1000 g.

According to the invention, when the device comprises a plurality of weights, the shape of each of said weights may be independently identical or different, preferably identical.

According to the invention, when the device comprises a plurality of weights, the weight of each of said weights may be independently identical or different, preferably identical.

According to the invention, the weight of the weight may be suitable for the frequency of ultrasound emission. For example, for an ultrasound emission frequency of 35 kHz, the weight of the weight may be from 500 g to 1000 g. For example, for an ultrasound emission frequency of 20 kHz, the weight of the weight may be from 3000 g to 6000 g.

According to the invention, the ultrasound emission module and the weight may be connected directly to one another or by a connection element.

According to the invention, the ultrasound emission module and the weight may be connected coaxially directly to one another or by a connection element (EL).

According to the invention, the ultrasound emission module, equipped coaxially with a weight, extends along a second axis (A2).

According to the invention, the second axis (A2) may be substantially parallel to the first axis (A1). For example, the angle formed by the first axis (A1) and the second axis (A2) may be from 0 to 15 degrees. Preferably, the angle formed by the first axis (A1) and the second axis (A2) may be equal to 0 degrees, the first axis and the second axis then being strictly parallel.

For example, when the ultrasound emission module and the weight are coaxially connected by a connection element, it may involve for example any connection element capable of connecting an ultrasound emission module and a weight known to the person skilled in the art and/or commercially available. According to the invention, the connection element may be of any size and/or shape suitable for fixing to an ultrasound emission module and/or to a weight.

According to the invention, the size of the connection element may be such that it allows, after coaxially fixing an ultrasound emission module and a weight, a space between the ultrasound emission module and a weight of between 2 and 5 cm.

According to the invention, the ultrasound emission module may be equipped, perpendicular to its axis, with at least one weight (P).

According to the invention, the ultrasound emission module and the weight may be connected perpendicularly directly to one another or by a connection element (EL).

According to the invention, when the ultrasound emission module is equipped perpendicularly with at least one weight, the weight may extend along a third axis (A3) and the ultrasound emission module along its second axis (A2).

According to the invention, the ultrasound emission module may be equipped perpendicularly with at least two weights, particularly two opposite weights.

According to the invention, when the ultrasound emission module is equipped perpendicularly with two weights, said two weights may extend coaxially along the third axis (A3) perpendicular to the second axis (A2) of the ultrasound emission module.

According to the invention the third axis (A3) formed by said at least one weight perpendicular to the axis of the ultrasound emission module may be substantially parallel to the first axis (A1). For example, the angle formed by the first axis (A1) and the third axis (A3) may be from 0 to 15°. Preferably, the angle formed by the first axis (A1) and the third axis (A3) may be equal to 0°, the first axis (A1) and the third axis (A3) then being strictly parallel.

According to the invention, the second axis (A2) formed by the ultrasound emission module equipped perpendicularly with at least one weight may be substantially perpendicular to the first axis (A1). For example, the angle formed by the first axis (A1) and the second axis (A2) may be from 85 to 95 degrees. Preferably, the angle formed by the first axis (A1) and the second axis (A2) may be equal to 90 degrees, the first axis (A1) and the second axis (A2) then being strictly perpendicular.

When the ultrasound emission module and said at least one weight are perpendicularly connected by a connection element, it may involve for example any suitable connection element capable of connecting an ultrasound emission module and a weight known to the person skilled in the art and/or commercially available. According to the invention, the connection element may be of any size and/or shape suitable for fixing to an ultrasound emission module and/or to a weight.

According to the invention, the size of the connection element may be such that it allows, after perpendicular fixing an ultrasound emission module and a weight, a space between the ultrasound emission module and said weight of from 4 to 12.5 cm.

According to the invention the size of the connection element may depend on the ultrasound emission frequency. For example, when the ultrasound emission frequency is 20 kHz, the size of the connection element may be equal to 2 cm. For example, when the ultrasound emission frequency is 35 kHz, the size of the connection element may be equal to 5 cm.

According to the invention, the connection element may for example be in a form chosen from the group comprising a tube, a cylinder, a flat tube, a tube corrugated along its length and/or its width, a parallelepiped, a rectangular parallelepiped with rounded edges. It may for example involve a connection element chosen from a bar, for example metal, a threaded rod. According to the invention, the connection element may be for example in the form chosen from the group comprising a cross, a diamond, a square, a T.

According to the invention, when the ultrasound emission module and said at least one weight are connected perpendicularly by a connection element, the shape of the connection element may be for example in the form chosen from the group comprising a cross, a diamond, a square, a T.

According to the invention, the ultrasound emission module and the weight may be connected at the ends and/or on all or part of the connection element.

For example, when the ultrasound emission module and the weight are directly connected coaxially to one another, they may be connected by any known suitable fixing element known to the person skilled in the art. For example, it may involve a mechanical fixing element or a combination of chemical and mechanical fixing.

For example, when the ultrasound emission module and said at least one weight are directly connected perpendicularly to one another, they may be connected by any known suitable fixing element known to the person skilled in the art. For example, it may involve a mechanical fixing element or a combination of chemical and mechanical fixing.

According to the invention, the chemical fixing element may be any chemical fixing element known to the person skilled in the art and/or commercially available. For example, it may involve a weld.

According to the invention, the mechanical fixing element may be any suitable mechanical fixing element known to the person skilled in the art and/or commercially available. For example, it may involve one or more studs, one or more anchoring pins and/or screws.

According to the invention, the fixing element may be located on an outer surface of the ultrasound emission module and/or of the weight. For example, the cement and/or stud and/or anchoring pin and/or screw may be located on an outer surface of the ultrasound emission module for its complementary arrangement directly or indirectly on a surface of the facing weight. For example, in a case of mechanical fixing, an outer surface of the ultrasound emission module and/or of the weight may comprise at least one anchoring stud and/or one threaded-rod type screw for complementary fixing with a surface facing the weight and/or the ultrasound emission module. According to the invention, the anchoring stud may be any stud known to the person skilled in the art. It may for example involve at least a stud and/or at least a pin that is circular, oval, quadrangular in shape. It may for example involve a stud and/or pin with a diameter greater than or equal to the diameter of the module. It may for example involve a stud and/or pin with a height from the concave inner surface greater than or equal to 0.6 times the diameter of the filtration module, for example from 2 to 5 cm.

According to the invention, the ultrasound emission module may be connected to the connection element by any suitable known fixing element known to the person skilled in the art. For example, the fixing element may be located on an outer surface of the ultrasound emission module and/or of the connection element. For example, the cement and/or stud and/or anchoring pin and/or screw may be located on an outer surface of the ultrasound emission module for its complementary arrangement directly or indirectly on a surface of the facing connection element. For example, in a case of mechanical fixing, an outer surface of the ultrasound emission module and/or of the connection element may comprise at least one anchoring stud and/or one threaded-rod type screw for complementary fixing with a surface facing the connection element and/or the ultrasound emission module. The anchoring stud may be any stud known to the person skilled in the art. It may for example involve at least a stud and/or at least a pin that is circular, oval, quadrangular in shape.

According to the invention, the weight may be connected to the connection element by any known suitable fixing element known to the person skilled in the art. For example, the fixing element may be located on an outer surface of the weight and/or of the connection element. For example, the cement and/or stud and/or anchoring pin and/or screw may be located on an outer surface of the weight for its complementary arrangement directly or indirectly on a surface of the facing connection element. For example, in a case of mechanical fixing, an outer surface of the weight and/or of the connection element may comprise at least one anchoring stud and/or one threaded-rod type screw for complementary fixing with a surface facing the connection element and/or the weight. The anchoring stud may be any stud known to the person skilled in the art. It may for example involve at least a stud and/or at least a pin that is circular, oval, quadrangular in shape.

According to the invention, when the ultrasound emission module is equipped perpendicularly with two weights, the shape of the connection element may be for example in the form chosen from the group comprising a cross, a diamond.

According to the invention, when the ultrasound emission module is equipped perpendicularly with two weights, the ultrasound emission module and said weights may be connected at the ends or at the tops of the connection element, said two weights being extended coaxially.

According to the invention, the ultrasound emission module (US) equipped coaxially with a weight (P) along the second axis (A2) may be fixed distant from the filtration module by a fixing means (MF).

According to the invention, the ultrasound emission module (US) equipped perpendicularly with at least one weight (P) along the third axis (A3) may be fixed distant from the filtration module by a fixing means (MF).

Fixing means is understood herein as any fixing means known to the person skilled in the art suitable for distant fixing of a weight to a filtration module. It may for example involve any commercially available fixing means suitable for distant fixing of a weight to a filtration module.

According to the invention, the fixing means (MF) may be of any size and/or shape suitable for distant fixing of the ultrasound emission module (US) equipped coaxially with a weight (P) to the filtration module.

According to the invention, the fixing means (MF) may be of any size and/or shape suitable for distant fixing of the ultrasound emission module (US) equipped perpendicularly with at least one weight (P) to the filtration module.

According to the invention, the size and/or shape of the fixing means may be such that it allows, after fixing the ultrasound emission module equipped coaxially with a weight (P) to the filtration module, a space between the ultrasound emission module equipped coaxially with a weight (P) and the filtration module greater than or equal to 2 cm.

According to the invention, the size and/or shape of the fixing means may be such that it allows, after fixing the ultrasound emission module equipped perpendicularly with at least one weight (P) to the filtration module, a space between the ultrasound emission module equipped perpendicularly with at least one weight (P) and the filtration module greater than or equal to 2 cm.

According to the invention, the size and/or shape of the fixing means may be such that it allows a spacing, for example substantially perpendicular to the axis A1 and/or A2 between the axes A1 and A2.

According to the invention, the size and/or shape of the fixing means may be such that it allows a spacing, for example substantially perpendicular to the axis A1 and/or A3 between the axes A1 and A3.

According to the invention, the fixing means may for example be in a form chosen from the group comprising a tube, a cylinder, a flat tube, a corrugated tube along its length and/or its width, a parallelepiped rectangle, a parallelepiped rectangle with rounded edges. It may for example involve a connection element chosen from among a bar, for example metal, a threaded rod, a flange. Preferably, the fixing means is chosen between a tube, a bar.

According to the invention, the fixing means may be of any suitable material known to the person skilled in the art. For example, the fixing means may be made of steel, stainless steel, titanium.

According to the invention the fixing means may be of any suitable shape enabling the surrounding of the filtration module while allowing distant fixing and ultrasound emission module equipped coaxially with a weight (P) or equipped perpendicularly with at least one weight (P). For example, it may involve a flange with fasteners or welded flange.

According to the invention the fixing means may be of any suitable shape enabling a direct fixing of the filtration module while allowing distant fixing and ultrasound emission module equipped coaxially with a weight (P) or equipped perpendicularly with at least one weight (P). For example, it may involve a threaded rod.

According to the invention, when the filtration module is fixed directly to the fixing means, it may be fixed to one end or to all or part of the connection element while still allowing while still allowing distant fixing and ultrasound emission module equipped coaxially with a weight (P) or equipped perpendicularly with at least one weight (P).

According to the invention the fixing means may be of any suitable shape enabling the surrounding of the ultrasound emission module equipped coaxially with a weight (P) or equipped perpendicularly with at least one weight (P). For example, it may involve a flange, a clip.

According to the invention, the fixing means may comprise a chemical and/or physical fixing means and/or element. For example, it may involve any means and/or chemical and/or physical fixing element known to the person skilled in the art enabling the attachment and/or the fixing of an ultrasound emission module or a weight, and/or allowing the attachment and/or fixing of the filtration module to the fixing means.

According to the invention, the chemical fixing means and/or element may be any chemical fixing means and/or element known to the person skilled in the art and/or commercially available. It may involve for example polymeric glue, cement, a weld, preferably a weld.

For example, the fixing means may be fixed by chemical fixing, for example by welding, to the outer surface of the filtration module.

According to the invention, the mechanical fixing means and/or element may be any mechanical fixing element known to the person skilled in the art and/or commercially available. For example, it may involve one or more studs, one or more anchoring pins, a threaded rod and/or screw.

For example, when the fixing means and/or element comprises a mechanical fixing, the outer surface of the ultrasound emission module or of a weight may comprise at least one threaded rod complementary with at least one screw thread present on the fixing means, for example for fixing the emission module or the weight to the fixing means.

According to the invention, the threaded rod may be any suitable threaded rod known to the person skilled in the art. It may for example involve at least a threaded rod that is circular, oval in shape. It may involve for example a threaded rod with a diameter of from 5 mm to 2 cm diameter, for example from 5 mm to 1 cm. It may involve for example threaded rod with a height from the outer surface of from 10 mm to 2 cm.

According to the invention, when the ultrasound emission module equipped coaxially with a weight (P) is fixed directly to the fixing means, it may be fixed at one end or over all or part of the connection element while allowing distant fixing of a filtration module.

According to the invention, when the ultrasound emission module equipped perpendicularly with the at least one weight (P) is fixed directly to the fixing means, it may be fixed at one end or over all or part of the connection element while allowing distant fixing a filtration module.

By his general knowledge, the person skilled in the art will know how to adapt the fixing means and/or choose the suitable fixing means based on the filtration module and/or the ultrasound emission module equipped coaxially with a weight (P).

By his general knowledge, the person skilled in the art will know how to adapt the fixing means and/or choose the suitable fixing means based on the filtration module and/or the ultrasound emission module equipped perpendicularly with at least one weight (P).

For example, when the fixing means and/or element comprises a mechanical fixing, the outer surface of the ultrasound emission module or of a weight may comprise at least one threaded rod complementary with at least one screw thread present on the fixing means, for example for fixing the emission module or the weight to the fixing means.

For example, when the outer surface of the filtration module is steel, stainless or titanium, the fixing means may be fixed to the filtration module by chemical fixing, for example by welding the fixing means to the surface of the filtration module.

According to the invention the fixing means (MF) may form a bridge (X) between the filtration module and the ultrasound emission module equipped coaxially with the weight (P) or equipped perpendicularly with at least one weight (P1, P2).

According to the invention the bridge (X) formed between the filtration module and the ultrasound emission module equipped coaxially with the weight or equipped perpendicularly with at least one weight (P) may vary depending on the module.

According to the invention the length of the bridge (X) formed between the filtration module and the ultrasound emission module equipped coaxially with the weight or equipped perpendicularly with at least one weight (P) may be based on the ultrasound emission frequency.

According to the invention the length of the bridge (X) formed between the filtration module and the ultrasound emission module equipped coaxially with the weight or equipped perpendicularly with at least one weight (P) may vary depending on the weight of the filtration module and/or the ultrasound emission module.

According to the invention the thickness of the bridge (X) formed between the filtration module and the ultrasound emission module equipped coaxially with the weight or equipped perpendicularly with at least one weight (P) may be based on the ultrasound emission frequency.

According to the invention the thickness of the bridge (X) formed between the filtration module and the ultrasound emission module equipped coaxially with the weight or equipped perpendicularly with at least one weight (P) may be based on the weight of the filtration module and/or of the ultrasound emission module.

By his general knowledge, the person skilled in the art will know how to adapt the length and/or thickness bridge (X) and/or to choose the length and/or thickness bridge (X) adapted based on the filtration module and/or the ultrasound emission module equipped coaxially with a weight (P) or perpendicularly with at least one weight (P).

According to the invention, the fixing means (MF) may form a bridge (X), the bridge forming an angle of 90 to 105°, preferably of 90° relative to the first and/or second axis, preferably relative to both axes (A1, A2).

According to the invention, the fixing means (MF) may form a bridge (X), the bridge forming an angle of 90 to 105°, preferably of 90° relative to the first and/or third axis, preferably relative to both axes A1 and A3.

According to the invention, the fixing means (MF) may be fixed at any point along the filtration module along the first axis (A1). For example, the fixing means F may be fixed to the filtration module between one third and two thirds of the length of the filtration module along the first axis A1.

According to the invention, the fixing means (MF) may be fixed at any point to the ultrasound emission module or to the weight along the second axis (A2). For example, the fixing means may be fixed to the ultrasound emission module or to the weight between one third and two thirds along the second axis A2.

According to the invention, the fixing means (MF) may be fixed at any point to said at least one weight, or to said two coaxial weights, along the third axis (A3). For example, the fixing means may be fixed to said at least one weight, or to said two coaxial weights, between one third and two thirds, preferably half, of the length along the third axis A3.

According to the invention, the filtration module, the fixing means and the ultrasound emission module equipped coaxially with its weight may form a single piece. For example, it may involve a molded part comprising two axes and a bridge connecting the two axes, one of the two axes comprising a filtration module and the other axis an ultrasound emission module and coaxially a weight.

According to the invention, the fixing means (MF) may be fixed at any point to the connection element (EL).

Advantageously, the inventors have demonstrated that the filtration module and the ultrasound module equipped with its weight go into resonance via the fixing means when the ultrasound emission module emits ultrasound.

Advantageously, the inventors have demonstrated that the device according to the invention may be used and/or installed and/or adapted for filtration devices and/or in existing installations. In other words, the device according to the invention may be used as replacement and/or in addition to the usual filtration device. Moreover, the inventors have demonstrated that the device according to the invention makes it possible to increase filtration performance by at least 20%, advantageously enabling better filtration efficiency and/or reducing, for example by an identical value the membrane surface area, advantageously enabling reduction in costs of filtration devices.

Other advantages may be seen by the person skilled in the art by reading the following examples, shown by the appended figures provided by way of illustration.

EXAMPLES

Example 1: Example of a Liquid Filtration Device (D) According to the Invention An example of a filtration device according to the invention is shown in the appended FIG. 2. In this figure, a tubular filtration module (F) extends along a first axis (A1). A bar corresponding to a fixing means (MF) is fixed to the filtration module (F) in the middle of the length of the tubular module along axis A1.

A tubular shaped ultrasound emission module (US) is connected coaxially along its axis with a conical shaped weight (P) by a connection element (EL).

Figure 2:
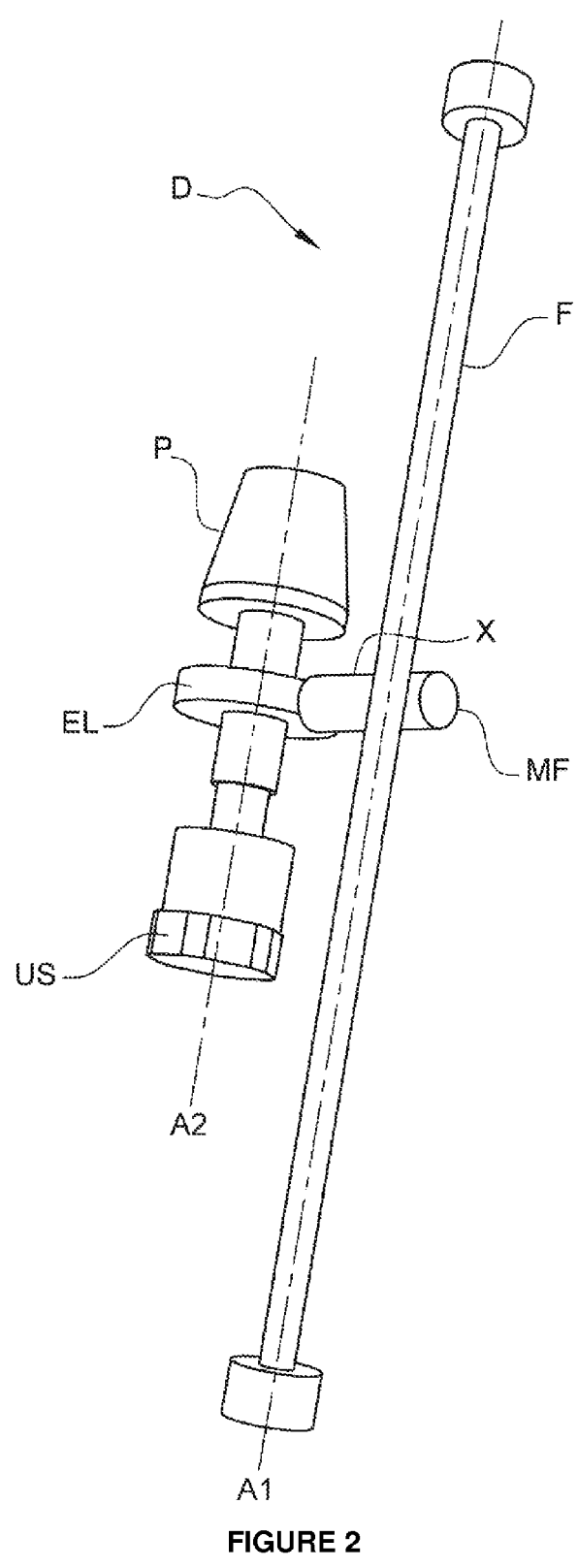
FIG. 2 is a perspective view of one embodiment of a filtration device (D).

The ultrasound emission module (US), coaxially connected to the conical shaped weight (P) by a connection element (EL), extends along a second axis (A2). As shown in FIG. 2, the connection element (EL) enables the ultrasound emission module and the weight to be connected. The connection element is connected with the bar constituting the fixing means (MF) in the middle of the length, along the axis (A2), of the assembly formed by the ultrasound emission module and the weight. As shown in this figure, the fixing means (MF forms a perpendicular bridge (X) between the filtration module and ultrasound emission module coaxially connected to the weight, and the angle formed by the axes A1 and A2 here is equal to 0 degrees.

The ultrasound emission module is 35 kHz.

Figure 1:
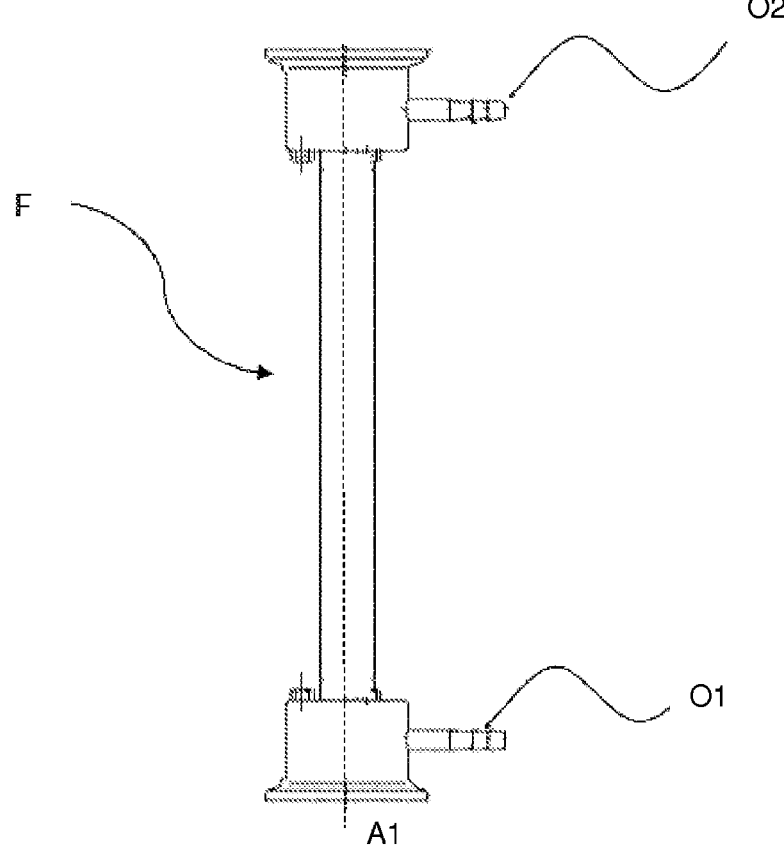
FIG. 1 is a cross-sectional view of a filtration module.

The filtration module is a Tami Industries monocanal module type filtration column. FIG. 1 shows a diagram of the filtration column when it rests on the ground, comprising the input (O2) and output (O1) of the liquid situated at the upper and lower ends of the filtration column.

Example 2: Example of Devices for Implementing the Invention

Figure 4:
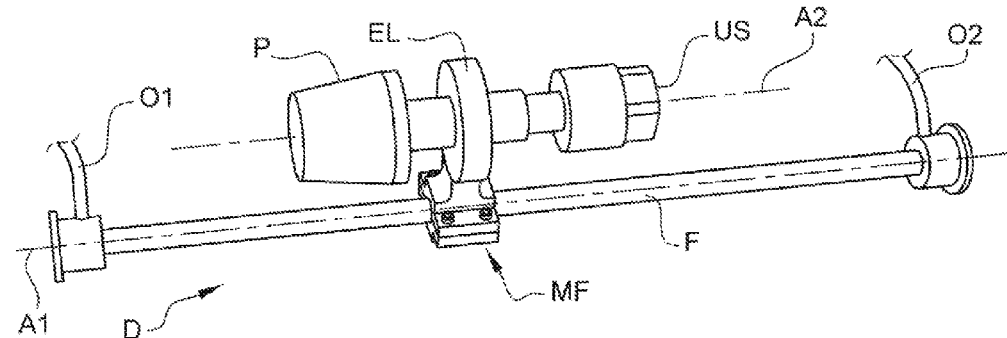
FIG. 4 is a perspective view of one embodiment of a filtration device (D) comprising the fixing means (MF) of FIGS. 3A and 3B.

An example of a filtration device according to the invention is shown in the appended FIG. 4. In this figure, a tubular filtration module (F), namely a Tami Industries monocanal module, extends along a first axis A1. The filtration column comprises an input (O2) for the liquid to be filtered and an output (O1) for the filtered liquid. The fixing means (MF) here is a fixing flange that surrounds the filtration module (F) halfway along the length of the tubular module along the axis (A1). The tubular shaped ultrasound emission module (US), namely a 35 kHz emitter, is coaxially connected at its axis (A2) with a conical shaped weight (P). As shown in this figure, the weight comprises an orifice complementary of a part of the ultrasound admission module enabling the housing and direct fixing of the ultrasound emission module (US) with the weight (P). As shown in the figure, the fixing flange (MF) makes it possible to connect, in the form of a bridge, the filtration column (F) with the weight in particular. The length of the bridge formed by the flange is 5 cm. Furthermore, the bridge formed is a perpendicular bridge between the filtration module and the ultrasound emission module coaxially connected to the weight, and the angle formed by the axes (A1) and (A2) here is equal to 0 degrees.

Figures 3A, 3B:
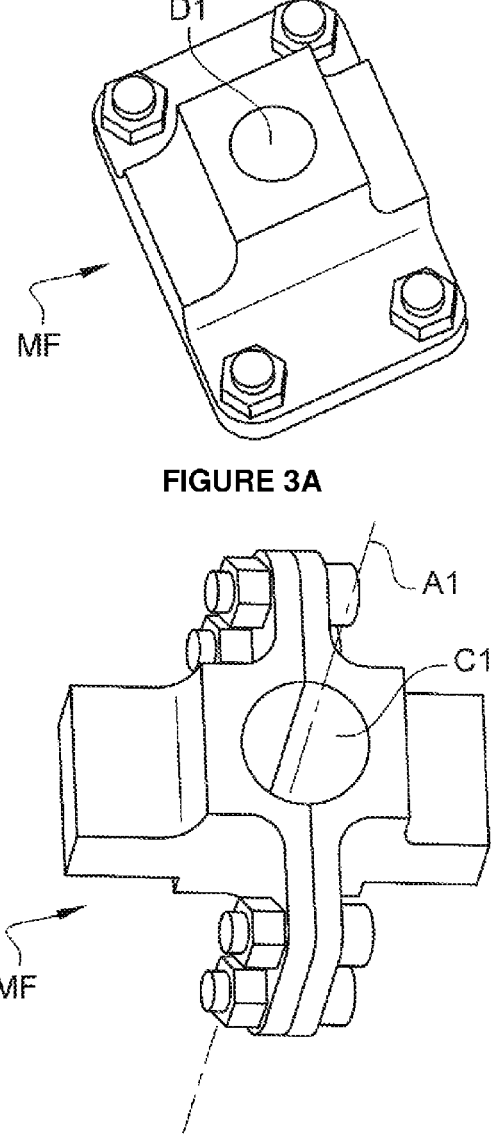
FIGS. 3A and 3B are schematic representations in perspective of one embodiment of a fixing means (MF), from two angles of view.

FIG. 3A shows the surface of the flange facing the weight and comprising an orifice (Dl) into which the connecting element (EL) of the weight is screwed for the mechanical fixing thereof. FIG. 3B shows the fixing flange representing an orifice (C1) wherein, after installation, surrounds the filtration column, the diameter of the orifice C1 being identical to the diameter of the tubular filtration column (F).

Figure 6:
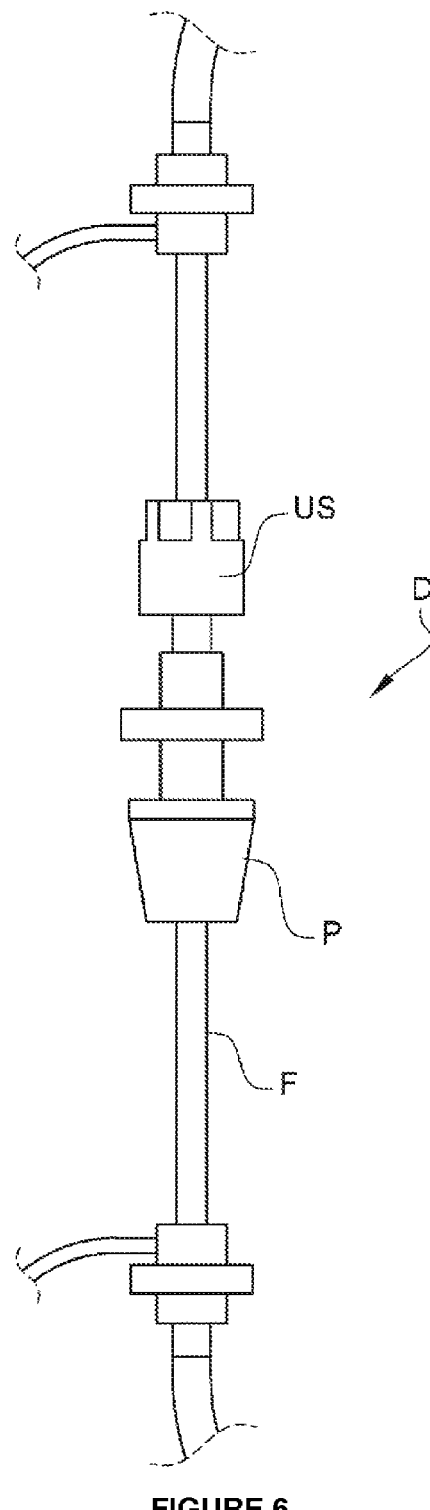
FIG. 6 is a side view of a filtration device (D) of FIG. 2.

FIG. 6 is a schematic representation along the axis formed by the bridge (X) of an example of filtration device comprising in the foreground the ultrasound emitter (US) connected to the weight (P), and in the background the filtration column (F).

Figure 5:
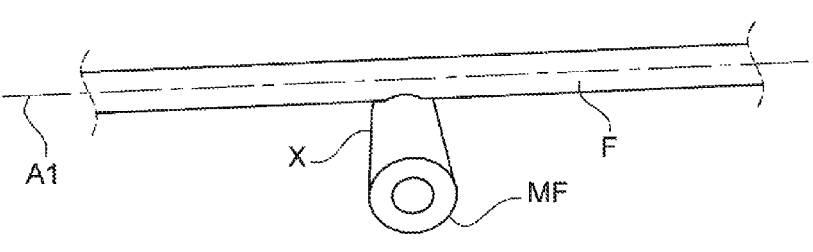
FIG. 5 is a perspective view of another fixing means (MF) fixed to the filtration module.

FIG. 5 is another example of the design of the fixing means (MF) between the filtration column (F) and the ultrasound emission module and/or the weight. The fixing means (MF) here is a solid steel tube comprising a central orifice along the longitudinal axis complementary with a threaded rod enabling a mechanical fixing of the ultrasound emission module and/or the weight. The fixing means (MF) is fixed onto the column (F) by chemical fixing, i.e, by welding of the tube onto the column. The angle formed by the longitudinal axis of the fixing means and the longitudinal axis of the column is equal to 90 degrees.

Figure 8A:
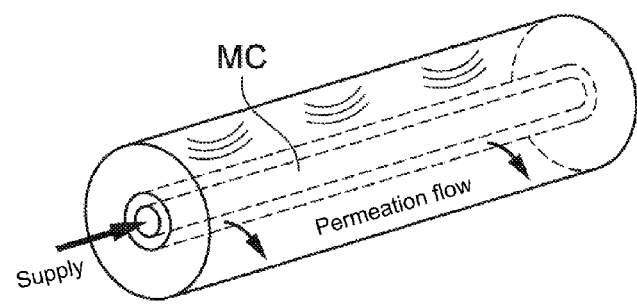
FIGS. 8A and 8B are two schematic views in perspective of a section of filtration modules comprising a ceramic membrane (MC).
Figure 8B:
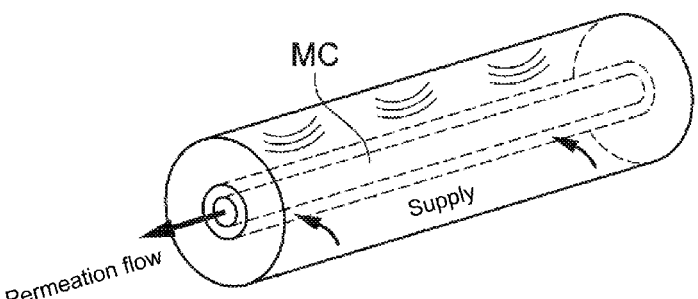

Example 3: Filtration of a Liquid with an Exemplary Device According to the Invention In this example, the filtration device (D) corresponds to the one in FIG. 2 comprising in particular a tubular filtration module F, namely a membrane module capable of filtering volumes of more than 10 liters of cellulose nanocrystal solutions and a monocanal ceramic filtration module 60 cm long. The filtration module used is shown in FIG. 8A representing in perspective a section of a filtration module comprising a ceramic membrane (MC), the ultrasound emitted and the direction of flow of the liquid to be filtered. In the present example, as shown in FIG. 8A, the direction of permeation, or direction of flow of the liquid to be filtered, is from the interior of the ceramic membrane (MC) to the exterior. In another embodiment, a filtration module may be used as shown in FIG. 8B representing in perspective a section of a filtration module comprising a ceramic membrane (MC), the ultrasound emitted and the direction of flow of the liquid to be filtered, wherein the direction of permeation or direction of flow of the liquid may be from the exterior of the ceramic membrane (MC) to the interior.

The filtration module has been placed in controlled vibration (continuous or pulsed mode) a commercial module at two frequencies 25 and 35 kHz via the coupling with the fixing means shown in FIG. 3 or shown in FIG. 5, the ultrasound emission module (US) was tubular in shape coaxially connected to the substantially conical/frustoconical shaped weight (P) as shown in FIG. 2.

Figure 7A:
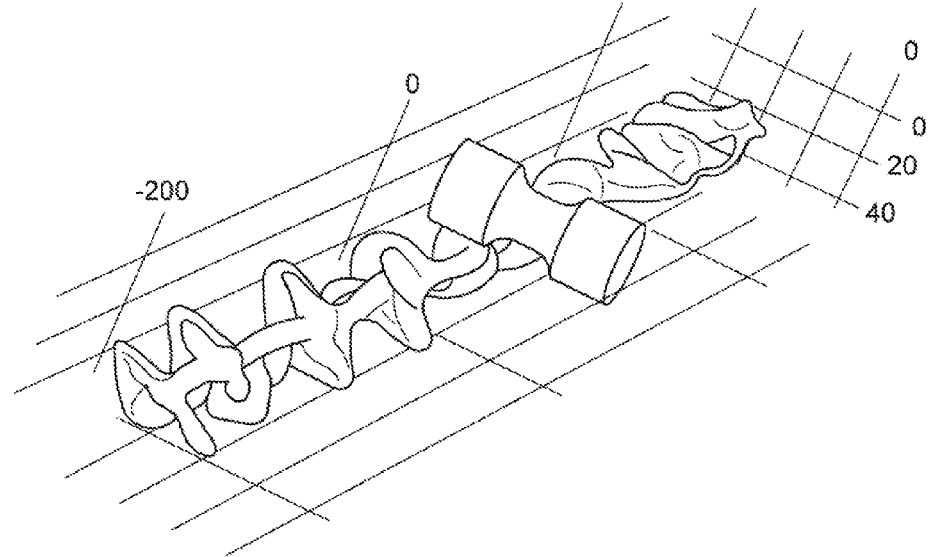
FIGS. 7A and 7B are two schematic views of a filtration module according to the invention during the implementation showing the propagation of the ultrasound along the filtration column.
Figure 7B:
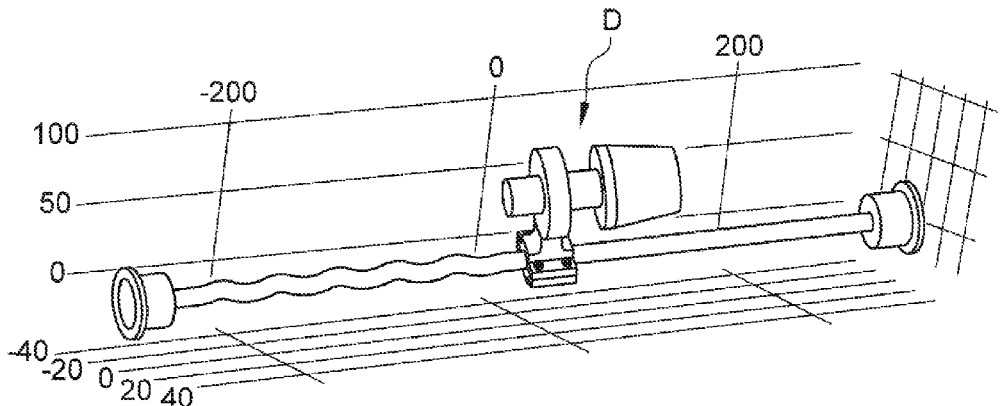

The emission of the ultrasound therefore allowed the filtration module to be placed under controlled vibration as shown in FIG. 7, representing and illustrating the vibration of the filtration module under the effect of ultrasound. As shown in FIGS. 7A and B, during application of ultrasound at a frequency of 35 kHz, a vibration amplitude of 60% was obtained, advantageously enabling a 23% increase of permeation flow.

Moreover, an evaluation of the filtration and comparative tests with an exemplary device according to the invention were carried out. The devices used correspond to those mentioned above.

The filtration was carried out at a temperature of $18\pm2°$ C., the frequency of the ultrasound applied was 35 kHz, the incoming flow rate Qv was 70 liters per hour ($L \cdot h^{-1}$).

The solution used for the filtration comprising a concentration of cellulose nanocrystals equal to 0.7 wt. % relative to the total weight of the solution.

The evaluation of the filtration was carried out by measuring the permeation flow. To do this, the weight of the permeate was acquired over time with a Kern PCB 2000 scale, which transmits the data to a computer via the control of an acquisition software made it possible to determine the permeation flow rate in kg/hr and then in L/hr.

Using the following equation, the permeation/permeate flow J was determined:

$$J = \frac{Q_p}{S}$$

J: flow of permeate (L·h$^{-1}$·m$^{-2}$)
$Q_p$: Permeate volume flow rate (L·h$^{-1}$)
S: membrane surface area (m$^2$)

Figure 9:
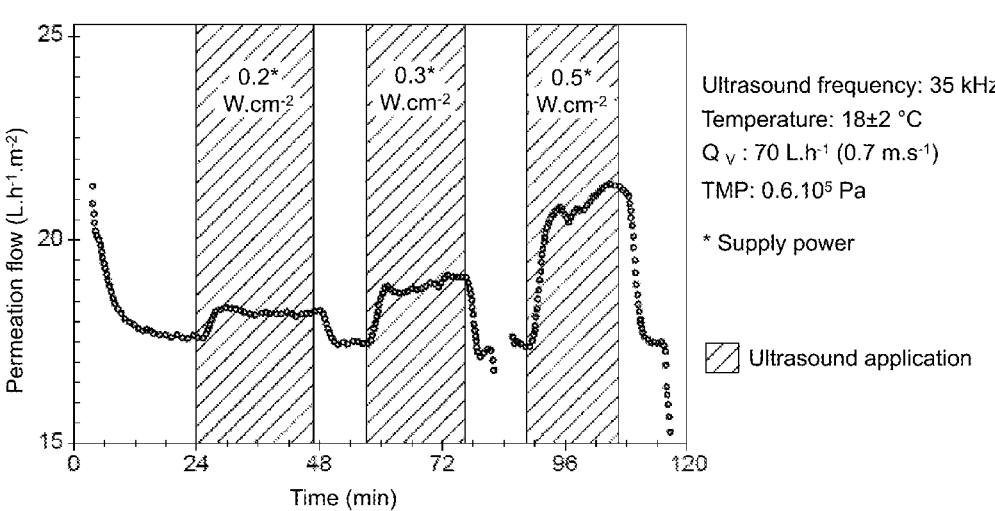
FIG. 9 is a diagram representing the permeation flow as a function of time, of the application or not of ultrasound and of their powers. In the diagram, the ordinate corresponds to the permeation flow in liters per hour per square meter $(\text{L}\cdot\text{h}^{-1}\cdot\text{m}^{-2})$ and the abscissa the time in minutes (min).

FIG. 9 is a diagram representing the permeation flow (L·h$^{-1}$·m$^{-2}$) as a function of time as a function of the application or not of ultrasound and the applied power. The transmembrane pressure was 0.6×10$^5$ Pa. The ultrasound powers applied were respectively 0.2, 0.3 or 0.5 W·cm$^{-2}$. The ultrasound, when applied, was continuous emission. As represented in this figure, during application of ultrasound, irrespective of the applied power, the permeation flow increases during application of ultrasound. The greatest increase appears for the highest power.

Figure 10:
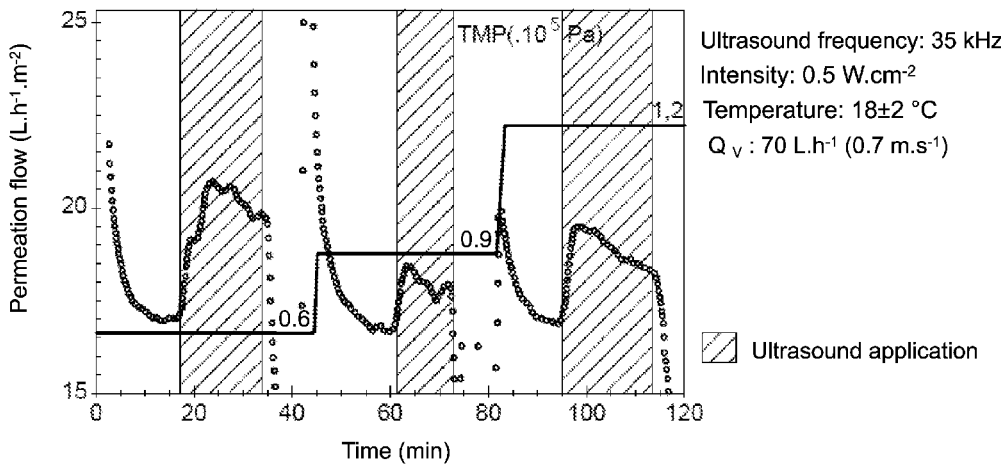
FIG. 10 is a diagram representing the permeation flow as a function of time, of the application or not of ultrasound and of the transmembrane pressure. In the diagram, the ordinate corresponds to the permeation flow in liters per hour per square meter $(\text{L}\cdot\text{h}^{-1}\cdot\text{m}^{-2})$ and the abscissa the time in minutes (min).

FIG. 10 is a diagram representing the permeation flow (L·h$^{-1}$·m$^{-2}$) as a function of time as a function of the application or not of ultrasound and the applied power. The transmembrane pressures were 0.6×10$^5$ Pa, 0.9×10$^5$ Pa or 1.2×10$^5$ Pa. The ultrasound power applied was 0.5 W·cm$^{-2}$. The ultrasound, when applied, was continuous emission. In this figure, the stair-step curve represents the change in pressure during the experiment. The curve in bold represents the change of the permeation flow. Without ultrasound, the flow appears to stabilize around 16-17 L/h/m$^2$ irrespective of the transmembrane pressure applied. As shown in this figure, during application of ultrasound, irrespective of the transmembrane pressure applied, the permeation flow increases during application of ultrasound. As demonstrated in this figure, the use of an exemplary device according to the invention advantageously makes it possible to increase the membrane permeation flow.

Figure 11:
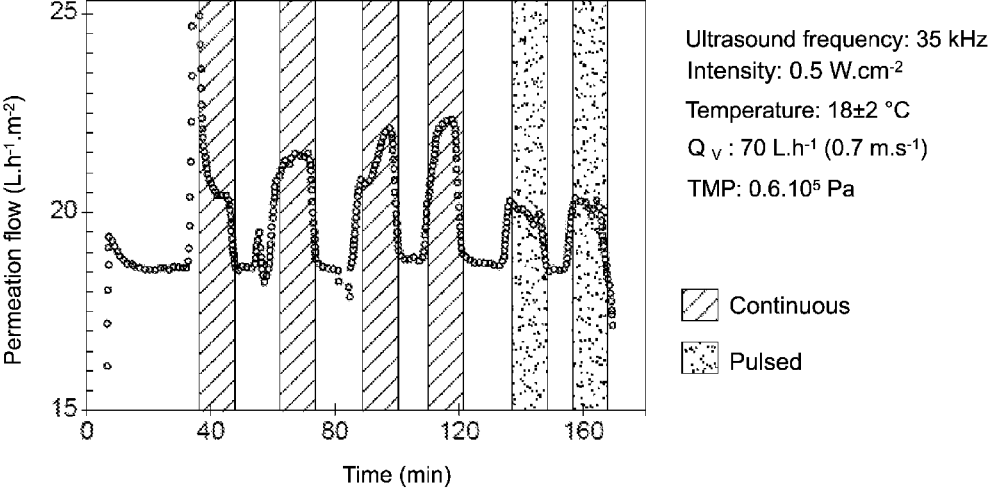
FIG. 11 is a diagram representing the permeation flow as a function of time, of the application or not of ultrasound and of the emission mode of the ultrasound: continuous (dark gray stripes) or pulsed (light gray stripe at around 130-140 min and 160-170 min). In the diagram, the ordinate corresponds to the permeation flow in liters per hour per square meter $(\text{L}\cdot\text{h}^{-1}\cdot\text{m}^{-2})$ and the abscissa the time in minutes (min).

FIG. 11 is a diagram showing the permeation flow (L·h$^{-1}$·m$^2$) as a function of time, of the application or not of ultrasound and of the emission mode of the ultrasound: continuous (dark gray stripes) or pulsed (light gray stripe at around 130-140 min and 160-170 min). During application in pulsed mode, the ultrasound was emitted according to the following cycle: 20 seconds of ultrasound then 5 seconds off. The transmembrane pressure was 0.6×10$^5$ Pa. The ultrasound power applied was 0.5 W·cm$^{-2}$. The curve represents the change of the permeation flow. As represented in this figure, during application of ultrasound, irrespective of the mode, the permeation flow increases during application of ultrasound.

Furthermore, a study of the possible effect of the ultrasound on the membrane was carried out in order to determine if the application of ultrasound was likely to alter the properties of the membranes. Two exemplary devices according to the invention were tested, differing by the fixing means MF, either a flange that surrounds the filtration module at the middle of the length of the tubular module along the axis A1 (FIG. 4) or the fixing means MF fixed on the column by chemical fixing, namely by welding of the tube onto the column (FIG. 5). Thus, the determination of the retention rate of cellulose nanocrystals present in the solution according to the following formula:

$$TR = \left(1 - \frac{C_{per}}{C_{alim}}\right) * 100$$

where $C_{per}$ corresponds to the concentration of cellulose nanocrystals at the output of the filtration module and $C_{alim}$ to the initial concentration cellulose nanocrystals.

Figure 12:
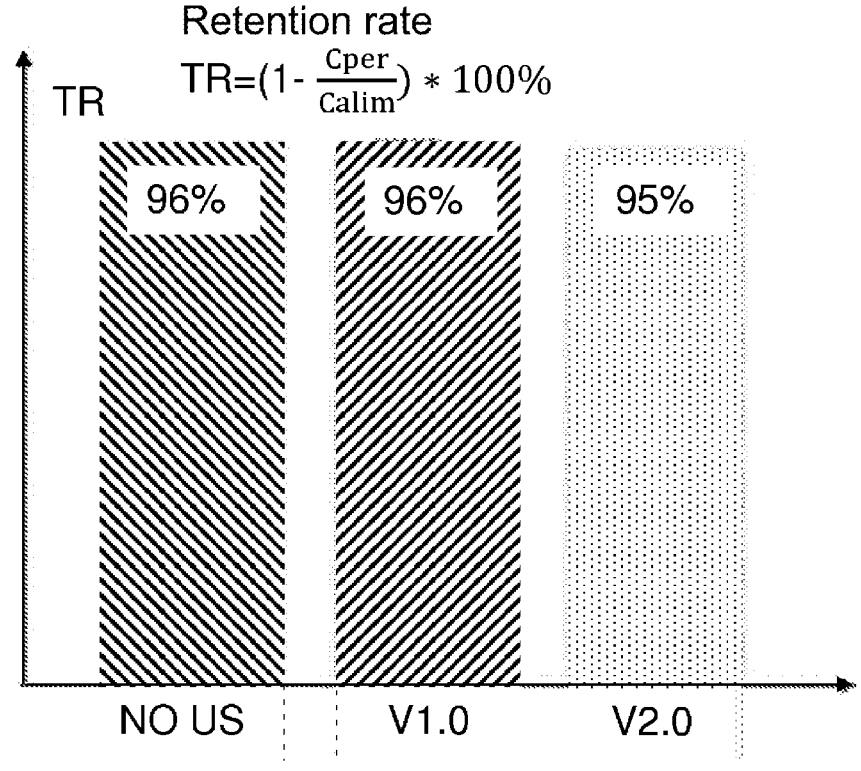
FIG. 12 is a histogram representing the rate of retention without ultrasound (NO US), or with ultrasound (V1.0 and V2.0 are 2 versions of studied ultrasound modules).

FIG. 12 is a histogram representing the retention rate obtained by exemplary devices according to the invention without the emission of ultrasound (NO US), or with emission of ultrasound with exemplary devices according to the invention comprising the fixing means MF, namely a flange shown in FIG. 3 (V1.0) or the fixing means MF shown in FIG. 5 (V2.0).

As shown in the figure, the application of ultrasound has no significant effect on the retention rate of the membrane, confirming that its selective structure or layer is not altered and/or modified by the ultrasound.

This example therefore clearly shows that the device advantageously makes it possible to significantly increase the filtration module filtration efficiency, for example of cellulose nanocrystals, and advantageously without modifying the structure thereof.

Furthermore, this example demonstrates that the device has improved filtration properties and capacities relative to known devices, advantageously makes it possible to be able to reduce the surface area of filter membranes and/or the number thereof, for example by at least 25%, while preserving the same filtration efficacy and/or an identical efficiency and/or efficacy and/or stable and homogeneous filtration efficiency over time.

Example 4: Another Example of a Liquid Filtration Device (D) According to the Invention Another exemplary design of a filtration device (D) according to the invention is shown in FIG. 13.

In this figure, a tubular filtration module (F) extends along a first axis (A1). The filtration module (F) here is a 7-membrane Kleansep (registered trademark) commercial module (Novasep, length 1178 mm, diameter 80). The filtration column comprises an input (O2) for the liquid to be filtered and an output (O1) for the filtered liquid. A bar corresponding to a fixing means (MF) is fixed to the filtration module in the middle of the length of the tubular module along axis A1. The ultrasound emission module (US) is connected, perpendicular to its axis (A2), with two opposite frustoconical weights (P1) and (P2) by a connection element (EL) which here is generally in the shape of a cross or a star with four branches distributed 90 degrees of angle apart. Each of the two weights (P1, P2) has a diameter of 13 cm and a height of 12.5 cm. The weight of each of the weights is 3 kg. The weights (P1) and (P2) are extended and are aligned along a third axis (A3).

Figure 13:
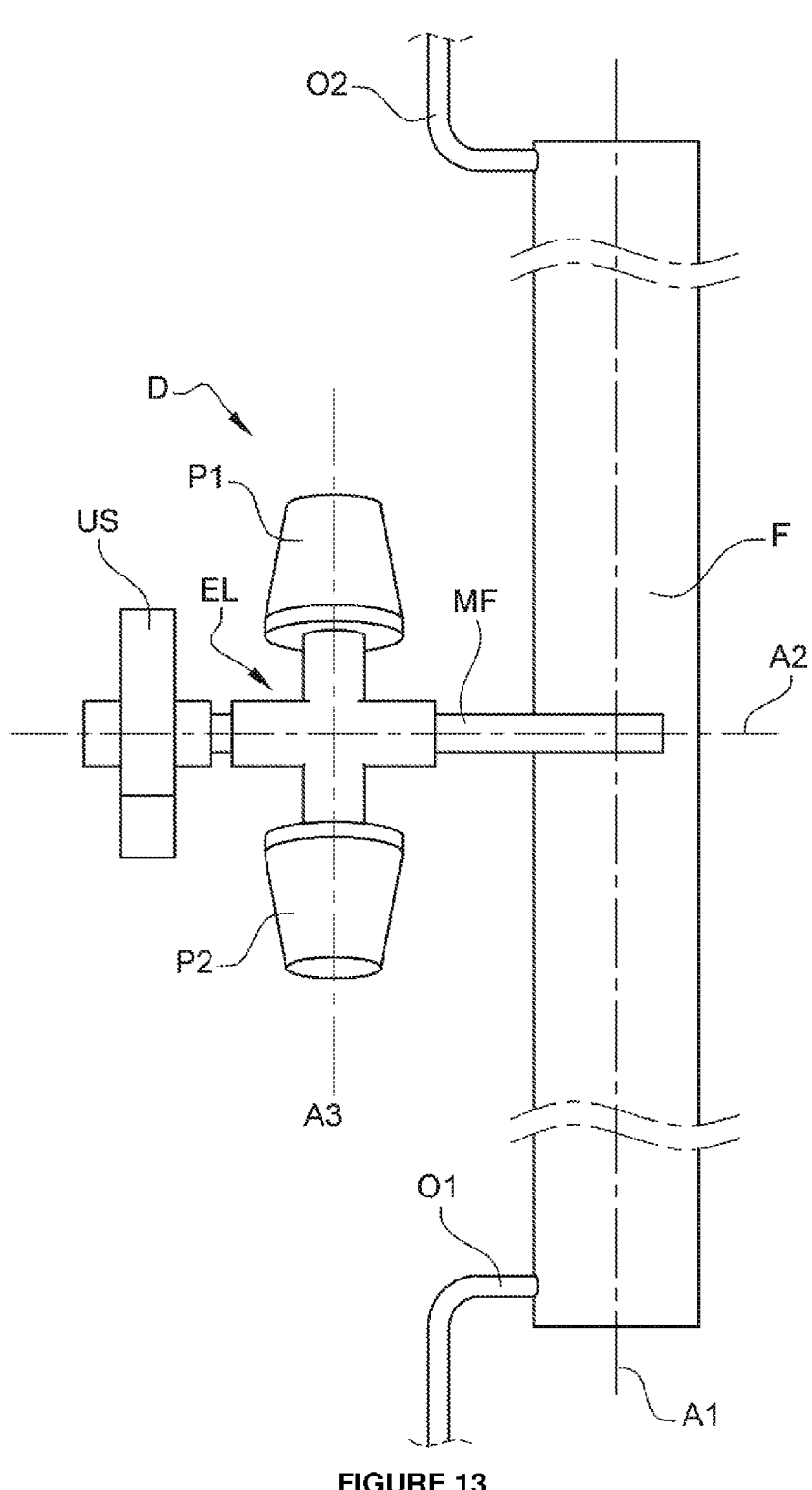
FIG. 13 is a front view of one embodiment of a filtration device (D) comprising two weights (P1, P2) arranged along a third axis (A3) perpendicular to the second axis (A2) of the ultrasound emission module (US).

As shown in FIG. 13, the connection element (EL) makes it possible to connect the ultrasound emission module (US), the set of two weights (P1 and P2) and the fixing means (MF).

The connection element (EL) is connected with the corresponding bar to the fixing means (MF).

Along the second axis (A2), the ultrasound emission module (US) and the fixing means (MF) are arranged axially on either side of the connection element (EL) and the two opposite weights (P1 and P2).

The weights (P1) and (P2) aligned along the third axis (A3) are arranged axially opposite on either side of the second axis (A2).

As shown in this figure, the fixing means (MF) forms a bridge between the filtration module (F) and the weights, and the angle formed by the axes (A1) and (A3) here is equal to 0 degrees.

The fixing means (MF) is fixed onto the filtration module by welding of the fixing means (MF) to the surface of the filtration module (F).

By way of nonlimiting example, the "cross shaped" connection element is for example produced from a single piece by machining or smelting and it comprises two perpendicular bores allowing the mounting and fixing, for one extending along the axis (A2), of the ultrasound emission module (US) and of the fixing means (MF), and for the other extending along the axis (A3) of two weights (P1 and P2).

The ultrasound emission module is 20 kHz with a maximum power of 1500 W.

The filtration module is the 7-membrane Kleansep (registered trademark) commercial module (Novasep, length 1178 mm, 80 mm diameter), comprising micro and ultrafiltration membranes BX, diameter 25 mm.

LISTS OF REFERENCES

1. Okahata and Noguchi, ultrasound responsive permeability control of bilayer coated capsule membrane, chemistry letters, pp. 1517-1520, 1983.
2. A. L. Ahmad, N. F. Che Lah, S. Ismail, B. S. Ooi, Membrane Antifouling Methods and Alternatives: Ultrasound Approach, Sep. Purif Rev. 41 (2012) 318-346. https://doi.org/10.1080/15422119.2011.617804.
3. Chai et al., 1999; X. Chai, T. Kobayashi, N. Fujii, Ultrasound-associated cleaning of polymeric membranes for water treatment, (1999) 139-146.
4. Gonzalez-Avila et al., Improved ultrasonic cleaning of membranes with tandem frequency excitation" Journal of Membrane Science 415-416 (2012) 776-783.
5. Mirzaie and Mohammadi, "Effect of ultrasonic waves on flux enhancement in microfiltration of milk", Journal of Food Engineering Volume 108, Issue 1, January 2012, Pages 77-86.
6. S. Muthukumaran, S. E. Kentish, G. W. Stevens, M. Ashokkumar, R. Mawson, The application of ultrasound to dairy ultrafiltration: The influence of operating conditions, J. Food Eng. 81, (2007) 364-373.
7. M. O. Lamminen, H. W. Walker, L. K. Weavers, Effect of Fouling Conditions and Cake Layer Structure on the Ultrasonic Cleaning of Ceramic Membranes, (2006) 3569.

The invention claimed is:

1. A liquid filtration device, comprising:
a filtration module extending along a first axis; and
an ultrasound emission module;
wherein the ultrasound emission module is fixed to the filtration module using a fixing means, and the ultrasound emission module is equipped perpendicular to a second axis with two weights arranged axially opposite on either side of the second axis of the ultrasound emission module,
wherein the ultrasound emission module and said two weights are connected by a connection element, wherein the connection element is in the shape of a cross, said two weights extending coaxially along a third axis perpendicular to the second axis,
wherein the filtration module and the ultrasound module equipped with the two weights are configured to go into resonance via the fixing means when the ultrasound emission module emits ultrasound.

2. The filtration device according to claim 1, wherein the filtration module is tubular shaped along the first axis.

3. The filtration device according to claim 1, wherein the fixing means is a flange which surrounds the filtration module and makes it possible to fix, distant from the filtration module, the ultrasound emission module equipped with said weight or said at least one weight.

4. The filtration device according to claim 1, wherein the fixing means is a chemical fixing means comprising at least one of a polymeric glue, a cement, and a weld.

5. The filtration device according to claim 1, wherein the fixing means is fixed to the filtration module by welding.

6. The filtration device according to claim 1, wherein said ultrasound emission module is fixed to the fixing means by a stud, an anchoring pin or one or more screws.

7. The filtration device according to claim 1, wherein the filtration module comprises a filter chosen from among a ceramic filter, a hollow fiber polymeric membrane, a ceramic membrane.

8. The device according to claim 1, wherein the filtration module, the fixing means and the ultrasound emission module equipped with its weight form a single piece.

* * * * *